(12) United States Patent
Vadapalli et al.

(10) Patent No.: US 11,716,782 B2
(45) Date of Patent: Aug. 1, 2023

(54) ENHANCED CDRX OPERATION

(71) Applicant: QUALCOMM Incorporated, San Diego, CA (US)

(72) Inventors: Syam Pavan Vadapalli, Visakhapatnam (IN); Roop Sagar Inakollu, Nellore (IN); AnkammaRao Ravuvari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/357,458

(22) Filed: Jun. 24, 2021

(65) Prior Publication Data
US 2022/0418035 A1 Dec. 29, 2022

(51) Int. Cl.
*H04W 76/28* (2018.01)
*H04W 88/06* (2009.01)

(52) U.S. Cl.
CPC ............ *H04W 76/28* (2018.02); *H04W 88/06* (2013.01)

(58) Field of Classification Search
CPC .............................. H04W 76/28; H04W 88/06
USPC .......................................................... 370/328
See application file for complete search history.

(56) References Cited

U.S. PATENT DOCUMENTS

| | | | | |
|---|---|---|---|---|
| 11,388,676 B2* | 7/2022 | Belghoul | ............ | H04W 52/367 |
| 2013/0201892 A1* | 8/2013 | Holma | ................ | H04W 76/28 |
| | | | | 370/311 |
| 2015/0304883 A1* | 10/2015 | Tabet | ................ | H04W 28/0289 |
| | | | | 370/238 |
| 2015/0305056 A1* | 10/2015 | Vangala | ................ | H04L 1/1848 |
| | | | | 455/450 |
| 2015/0319720 A1* | 11/2015 | Svedman | ............... | H04W 52/52 |
| | | | | 455/522 |
| 2016/0316483 A1* | 10/2016 | Ahn | ....................... | H04W 16/14 |

FOREIGN PATENT DOCUMENTS

| | | | | |
|---|---|---|---|---|
| KR | 20210003105 A | * | 1/2021 | ............ H04W 64/00 |
| TW | 202112178 A | * | 3/2021 | ............ H04B 1/005 |
| WO | 2021056494 A1 | | 4/2021 | |

OTHER PUBLICATIONS

"3rd Generation Partnership Project, Technical Specification Group Radio Access Network, Evolved Universal Terrestrial Radio Access (E-UTRA) and NR, Multi-Connectivity, Stage 2 (Release 16)", 3GPP Standard, Technical Specification, 3GPP TS 37.340, 3rd Generation Partnership Project, Mobile Competence Centre, 650, Route Des Lucioles, F-06921 Sophia-Antipolis Cedex, France, vol. RAN WG2, No. V16.5.0, Mar. 29, 2021, pp. 1-84, XP052000113, sections 4, 6, 7 in particular subsections 7.10, and section 10.

(Continued)

*Primary Examiner* — Inder P Mehra
(74) *Attorney, Agent, or Firm* — Patterson + Sheridan, LLP

(57) ABSTRACT

Certain aspects of the present disclosure provide a technique for signaling user equipment (UE) assistance information (UAI) indicating a preferred set of connected discontinuous reception (CDRX) parameters, a start offset, and/or a slot offset to a network entity. For example, a UE signals the UAI when operating in a dual connectivity mode involving a new radio (NR) and a long term evolution (LTE). The UE signals the UAI via a new information element (IE). The UE receives a new set of CDRX parameters from the network entity based on the UAI. The UE uses the new set of CDRX parameters for a CDRX operation.

30 Claims, 13 Drawing Sheets

(56) References Cited

OTHER PUBLICATIONS

CATT: "Reporting UE Assistance Info to NR SN", 3GPP TSG-RAN WG2 Meeting #109 electronic, R2-2000255, 3rd Generation Partnership Project, Mobile Competence Centre, 650, Route Des Lucioles, F-06921, Sophia-Antipolis Cedex, France, vol. RAN WG2, No. Elbonia, Feb. 24, 2020-Mar. 6, 2020, Feb. 14, 2020, XP051848893, 37 pages, sections 1-3 and 5.
Ericsson: "UE Assistance Information for cDRX Configuration", 3GPP TSG-RAN2 Meeting #107bis, R2-1913200 UE Assistance Information for cDRX Configuration, 3rd Generation Partnership Project, Mobile Competence Centre, 650, Route Des Lucioles, F-06921, Sophia-Antipolis Cedex, vol. RAN WG2, No. Chongqing, China, Oct. 14, 2019-Oct. 18, 2019, Oct. 4, 2019, XP051804891, 2 Pages, sections 1-3.
Huawei et al., "UE Assistance Information in MR-DC", 3GPP TSG-RAN2 Meeting#107bis, R2-1913790 (update of R2-1911250) UE Assistance Information in MR-DC, 3rd Generation Partnership Project, Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, 2 Pages, XP051805254, sections 1-3.
International Search Report and Written Opinion—PCT/US2022/072934—ISA/EPO—dated Sep. 14, 2022.

* cited by examiner

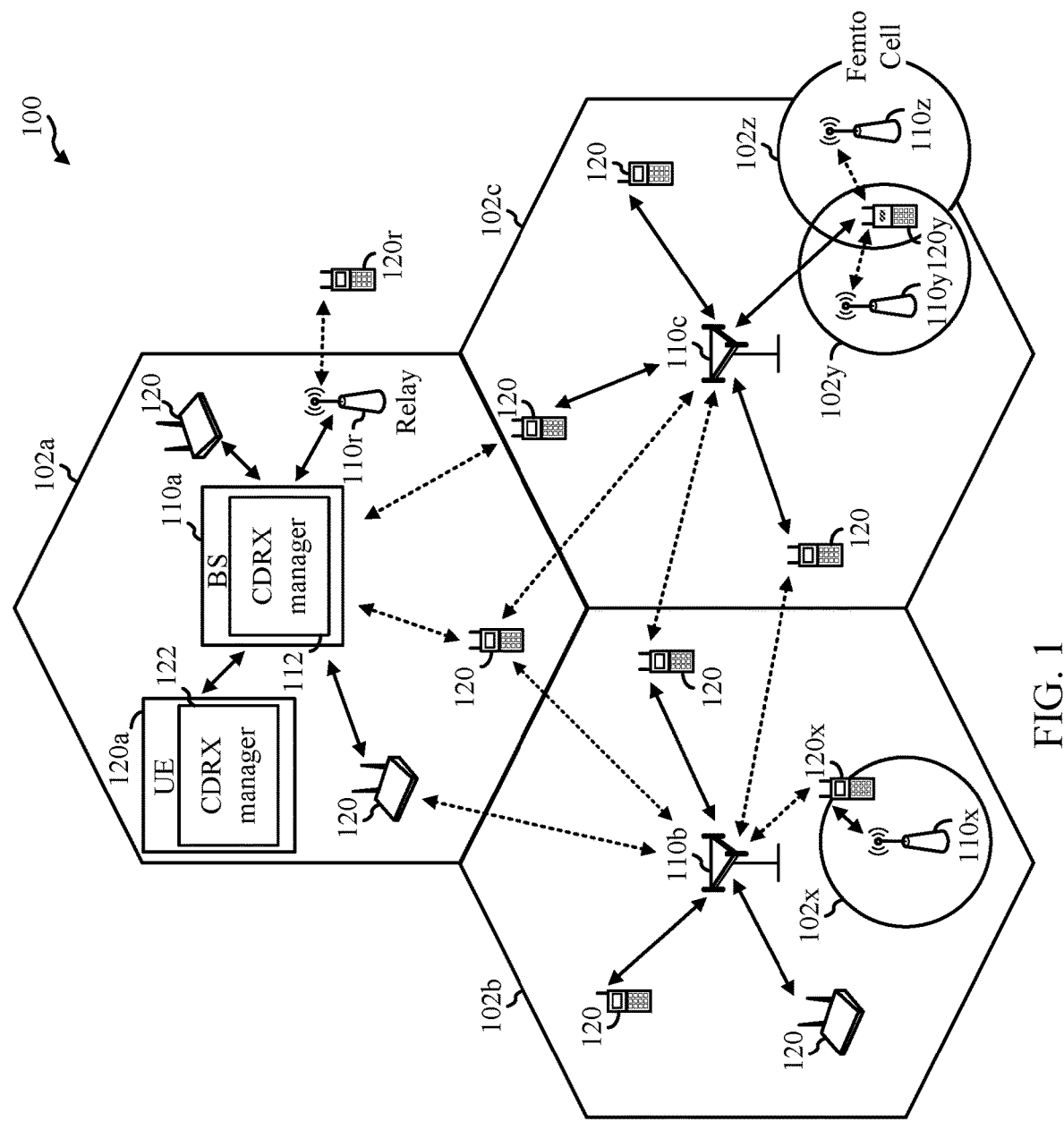
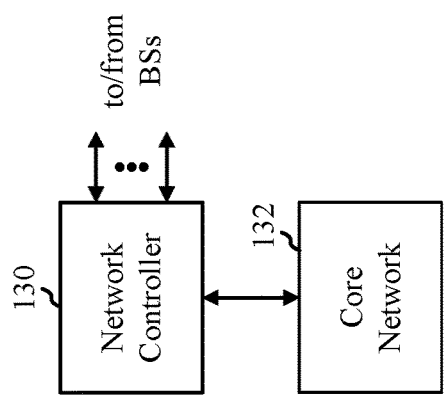
FIG. 1

```
DRX-Preference-r16 ::=     SEQUENCE {
  preferredDRX-InactivityTimer-r16
    ENUMERATED {
      ms0, ms1, ms2, ms3, ms4, ms5, ms6, ms8, ms10, ms20, ms30, ms40, ms50, ms60, ms80,
      ms100, ms200, ms300, ms500, ms750, ms1280, ms1920, ms2560, spare9, spare8,
      spare7, spare6, spare5, spare4, spare3, spare2, spare1} OPTIONAL,
  preferredDRX-LongCycle-r16
    ENUMERATED {
      ms10, ms20, ms32, ms40, ms60, ms64, ms70, ms80, ms128, ms160, ms256, ms320, ms512,
      ms640, ms1024, ms1280, ms2048, ms2560, ms5120, ms10240, spare12, spare11, spare10,
      spare9, spare8, spare7, spare6, spare5, spare4, spare3, spare2, spare1} OPTIONAL,
  preferredDRX-ShortCycle-r16
    ENUMERATED {
      ms2, ms3, ms4, ms5, ms6, ms7, ms8, ms10, ms14, ms16, ms20, ms30, ms32,
      ms35, ms40, ms64, ms80, ms128, ms160, ms256, ms320, ms512, ms640, spare9,
      spare8, spare7, spare6, spare5, spare4, spare3, spare2, spare1} OPTIONAL,
  preferredDRX-ShortCycleTimer-r16
    INTEGER (1..16) OPTIONAL
}
```

FIG. 6

```
DelayBudgetReporting
 type:                   CHOICE {
                             ENUMERATED {
                                 msMinus1280, msMinus640, msMinus320, msMinus160,msMinus80, msMinus60, msMinus40,
                                 msMinus20, ms0, ms10,ms40, ms60, ms80, ms160, ms320, ms640, ms1280},
                             ...
                         }
```

FIG. 7

ENHANCED CDRX OPERATION

BACKGROUND

Field of the Disclosure

Aspects of the present disclosure relate to wireless communications, and more particularly, mechanisms that may enhance connected discontinuous reception (CDRX) operation of a UE.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for a user equipment (UE) to signal UE assistance information (UAI) indicating a preferred set of connected discontinuous reception (CDRX) parameters, a start offset, and a slot offset for a CDRX operation to a network entity via a new information element (IE).

Certain aspects provide a method of wireless communications by a UE. The method generally includes receiving, from a network entity, a configuration indicating a first set of CDRX parameters for a CDRX operation while in a dual connectivity mode involving a first radio access technology (RAT) and a second RAT; sending a request to the network entity indicating a preferred set of CDRX parameters; and receiving, from the network entity, a second set of CDRX parameters in response to the request.

Certain aspects provide a method of wireless communications by a network entity. The method generally includes sending, to a UE, a configuration indicating a first set of CDRX parameters for a CDRX operation while in a dual connectivity mode involving a first RAT and a second RAT; receiving, from the UE, a request indicating a preferred set of CDRX parameters; and sending, to the UE, a second set of CDRX parameters in response to the request.

Certain aspects provide an apparatus for wireless communications by a UE. The apparatus generally includes at least one processor and a memory configured to: receive, from a network entity, a configuration indicating a first set of CDRX parameters for a CDRX operation while in a dual connectivity mode involving a first RAT and a second RAT; send a request to the network entity indicating a preferred set of CDRX parameters; and receive, from the network entity, a second set of CDRX parameters in response to the request.

Certain aspects provide an apparatus for wireless communications by a network entity. The apparatus generally includes at least one processor and a memory configured to: send, to a UE, a configuration indicating a first set of CDRX parameters for a CDRX operation while in a dual connectivity mode involving a first RAT and a second RAT; receive, from the UE, a request indicating a preferred set of CDRX parameters; and send, to the UE, a second set of CDRX parameters in response to the request.

Certain aspects provide an apparatus for wireless communications. The apparatus generally includes means for receiving, from a network entity, a configuration indicating a first set of CDRX parameters for a CDRX operation while in a dual connectivity mode involving a first RAT and a second RAT; means for sending a request to the network entity indicating a preferred set of CDRX parameters; and means for receiving, from the network entity, a second set of CDRX parameters in response to the request.

Certain aspects provide an apparatus for wireless communications. The apparatus generally includes means for sending, to a UE, a configuration indicating a first set of CDRX parameters for a CDRX operation while in a dual connectivity mode involving a first RAT and a second RAT; means for receiving, from the UE, a request indicating a preferred set of CDRX parameters; and means for sending, to the UE, a second set of CDRX parameters in response to the request.

Certain aspects of the subject matter described in this disclosure can be implemented in a computer readable medium storing computer executable code thereon for wireless communications. The computer readable medium comprises code for receiving, from a network entity, a configuration indicating a first set of CDRX parameters for a CDRX operation while in a dual connectivity mode involving a first RAT and a second RAT; code for sending a request to the network entity indicating a preferred set of CDRX parameters; and code for receiving, from the network entity, a second set of CDRX parameters in response to the request.

Certain aspects of the subject matter described in this disclosure can be implemented in a computer readable medium storing computer executable code thereon for wireless communications. The computer readable medium comprises code for sending, to a UE, a configuration indicating a first set of CDRX parameters for a CDRX operation while in a dual connectivity mode involving a first RAT and a second RAT; code for receiving, from the UE, a request indicating a preferred set of CDRX parameters; and code for sending, to the UE, a second set of CDRX parameters in response to the request.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example wireless communication network, in accordance with certain aspects of the present disclosure.

FIG. 6 depicts an example information element (IE) for indicating a DRX preference, in accordance with certain aspects of the present disclosure.

FIG. 7 depicts an example IE for indicating a delay budget report, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
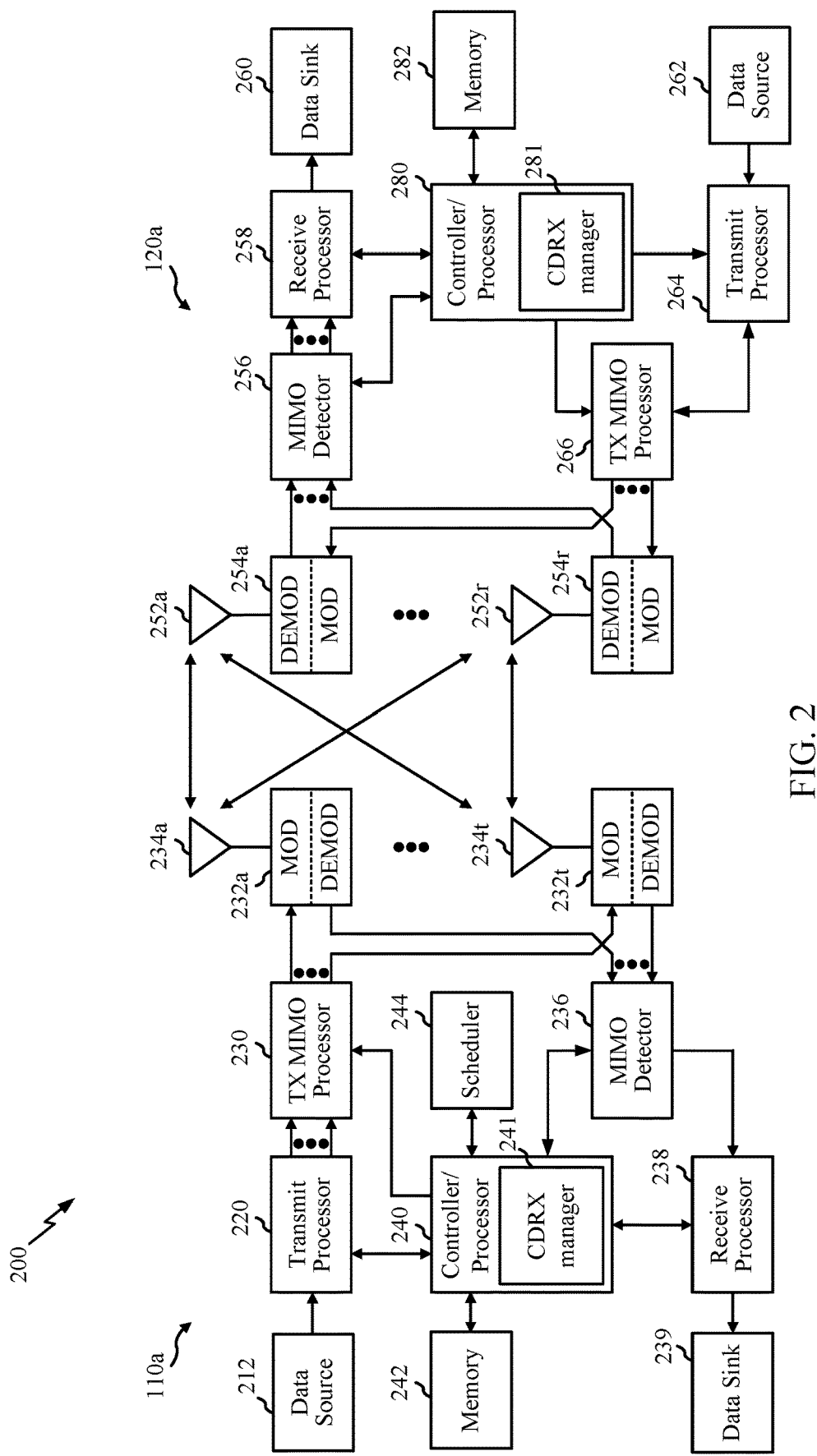
FIG. 2 is a block diagram conceptually illustrating a design of an example base station (BS) and a user equipment (UE), in accordance with certain aspects of the present disclosure.

Aspects of the present disclosure provide apparatuses, methods, processing systems, and computer readable mediums for signaling user equipment (UE) assistance information (UAI) indicating a preferred set of connected discontinuous reception (CDRX) parameters, a start offset, and/or a slot offset to a network entity. For example, a UE signals the UAI when operating in a dual connectivity mode involving a new radio (NR) and a long term evolution (LTE). The UE signals the UAI via a new information element (IE) (e.g., when the UE operates on the NR and the LTE with a band combination that results in sharing of some radio frequency (RF) front end (RFFE) components). The UE receives a new set of CDRX parameters from the network entity based on the UAI. The UE uses the new set of CDRX parameters for a CDRX operation.

The following description provides examples of signaling UAI indicating a preferred set of CDRX parameters, a start offset, and a slot offset via a new IE in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for enhanced connected discontinuous reception (CDRX) operations in a new radio (NR). As shown in FIG. 1, a UE 120a includes a CDRX manager 122 configured to generate and signal preferred set of CDRX parameters, a start offset, and/or a slot offset via an information element (IE) in accordance with operations 900 of FIG. 9. A BS 110a includes a CDRX manager 112 configured to perform operations 1000 of FIG. 10 to receive and process preferred set of CDRX parameters, the start offset, and/or the slot offset (provided by the UE performing operations 900 of FIG. 9).

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a CDRX manager 241 that may be configured to perform the operations illustrated in FIG. 10, as well as other operations disclosed herein. As shown in FIG. 2, the controller/processor 280 of the UE 120a has a CDRX manager 281 that may be configured to perform the operations illustrated in FIG. 9, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
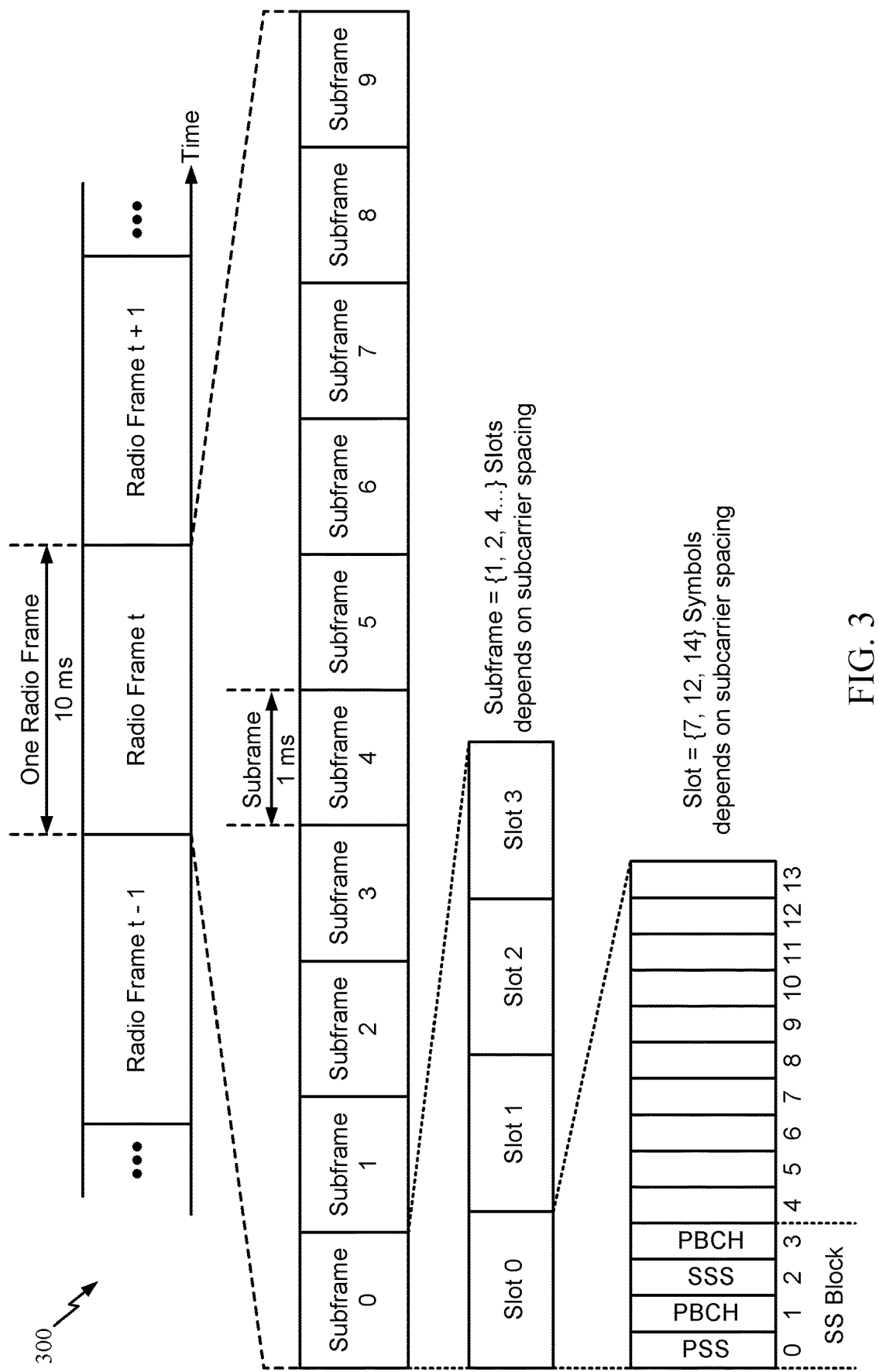
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example CDRX Operation and Wake Up Signals

Figure 4:
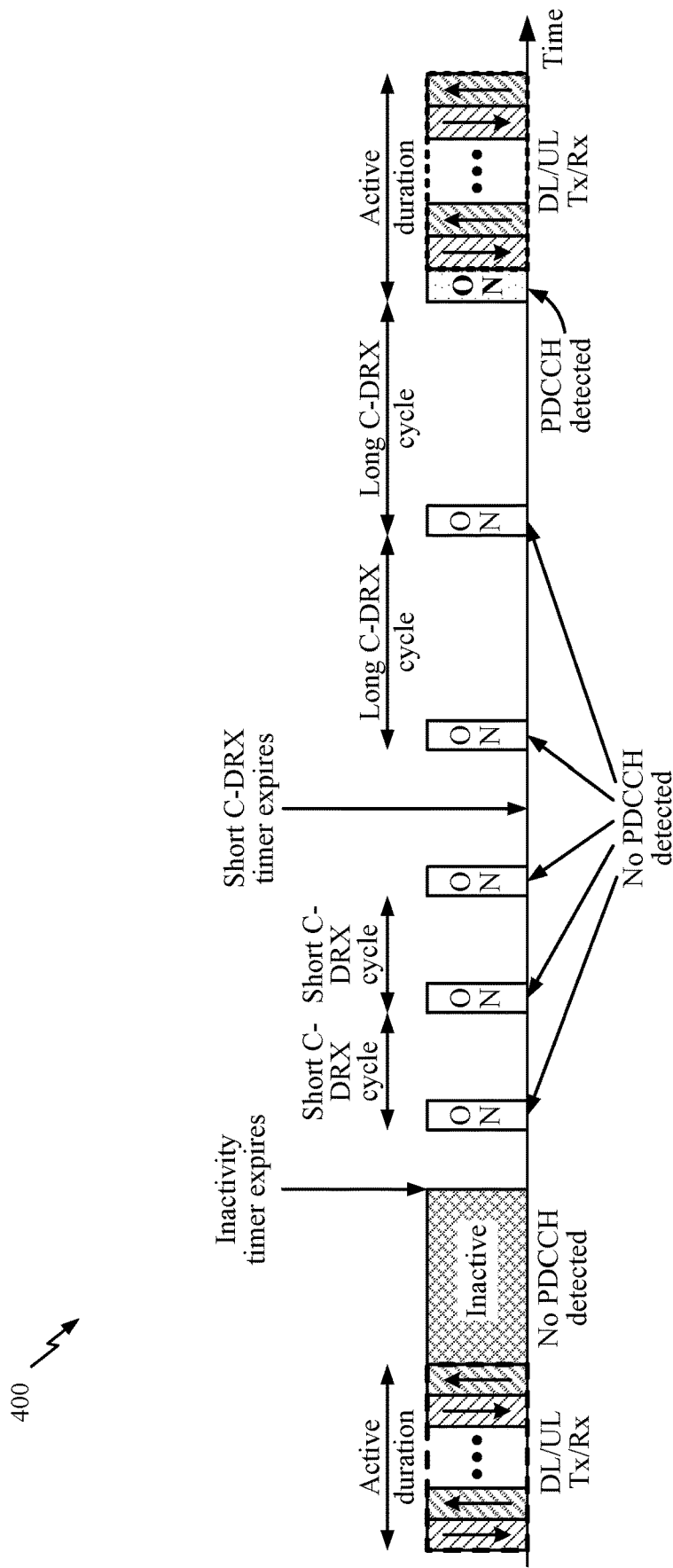
FIG. 4 illustrates connected mode discontinuous reception (CDRX) operations, in accordance with certain aspects of the present disclosure.

As illustrated in an example timing diagram 400 of FIG. 4, during periods of traffic inactivity, a user equipment (UE) switches to a connected discontinuous reception (CDRX) operation for power saving. In the CDRX, when there is no data transmission in either direction (an uplink (UL)/a downlink (DL)) for a UE in a radio resource control (RRC) connected mode, the UE goes into a DRX mode. In the CDRX, the UE monitors a physical downlink control channel (PDCCH) discontinuously. In other words, the UE alternates between sleep (DRX OFF) cycles and wake (DRX ON) cycles. The CDRX results in power savings because, without the DRX cycles, the UE would needlessly monitor for PDCCH transmissions in every subframe to check if there is DL data available.

The UE is configured for the CDRX according to various configuration parameters, such as an inactivity timer, short DRX timer, short DRX cycle, and long DRX cycle.

As further illustrated in FIG. 4, based on configured cycles, the UE wakes up occasionally for ON durations and monitors for the PDCCH transmissions. Except for the ON durations, the UE remains in a low power (sleep) state referred to as an OFF duration, for the rest of CDRX cycle. During the OFF duration, the UE is not expected to transmit and receive any signal.

The UE wakes up at a termination of a CDRX mode. For example, if the UE detects a PDCCH scheduling data during the ON duration, the UE remains on to transmit and receive data. Otherwise, the UE goes back to sleep at the end of the ON duration.

Example UE Assistance Information

Figure 5:
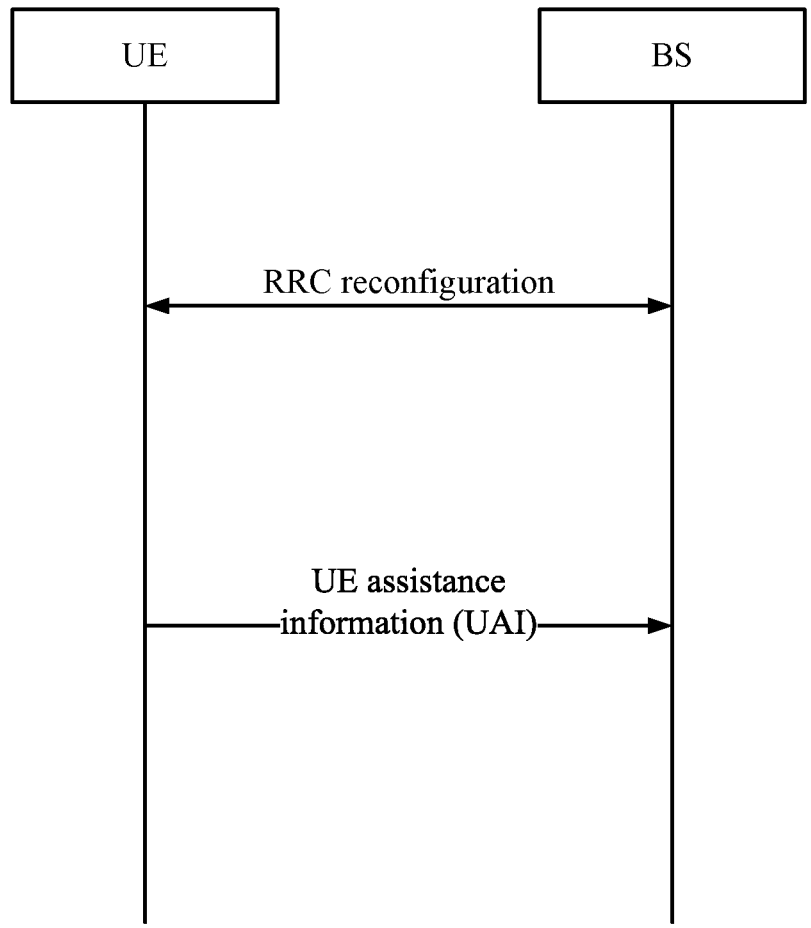
FIG. 5 is a call flow diagram illustrating an example of a UE providing assistance information to a BS, in accordance with certain aspects of the present disclosure.

In certain wireless communication systems (e.g., $5^{th}$ generation (5G) new radio (NR)), a user equipment (UE) is configured to provide UE assistance information (UAI) to a base station (BS), as shown in FIG. 5. The UE uses the UAI to indicate various parameters such as a UE delay budget report (carrying desired increment/decrement in Uu air interface delay), a connected mode discontinuous reception (DRX) cycle length, or overheating assistance information to the BS.

In some cases, the UE capable of providing delay budget reporting in a radio resource control (RRC) state such as a RRC_CONNECTED state initiates a procedure of providing the UAI. For example, the UE initiates the procedure upon being configured to provide the delay budget report and upon change of a delay budget preference. As another example, the UE capable of providing the overheating assistance information in the RRC_CONNECTED state initiates the procedure if the UE is configured to do so, upon detecting internal overheating, or upon detecting that it the UE no longer experiencing an overheating condition.

Example CDRX Operation During Shared LNA Combos

In certain wireless communication systems (e.g., $5^{th}$ generation (5G) new radio (NR)), a user equipment (UE) may be configured to communicate with multiple groups of cells, such as a master cell group (MCG) and a secondary cell group (SCG), which is referred to as dual connectivity. The dual connectivity enables a network to provide more bandwidth to the UE depending on a resource budget allocated to each cell group. The master cell group may be limited on its resource budget due to an influx of connected UEs. The network may configure one of the UEs for the dual connectivity with the secondary cell group to offload some of bandwidth consumed by the UE. In other cases, dual connectivity may enable the network to provide low latency radio bearers to the UE via one of the cell groups, such as the secondary cell group, and allow other traffic to flow through the master cell group.

Aspects of the present disclosure provide techniques for signaling UE assistance information (UAI) in various configurations. For example, the techniques described herein are used in evolved UMTS terrestrial radio access network (E-UTRAN) new radio—dual connectivity (ENDC) mode involving multiple radio access technology (RAT) combinations, multiple radio dual connectivity (MRDC) mode, NR—carrier aggregation (CA) mode, or other operating modes.

In ENDC non-standalone (NSA) or standalone (SA) connected mode, multiple RAT combinations (such as a first radio access technology (RAT) (e.g., a new radio (NR) RAT) and a second RAT (e.g., a long term evolution (LTE) RAT)) may have overlapping bands (e.g., B41+n41 frequency band). In a current implementation for such RAT combinations, radio frequency (RF) resources are shared between both the LTE and NR RATs (i.e. use of shared RF front end (RFFE) components, such as a shared low noise amplifier (LNA) to handle these RAT combinations that have overlapping bands).

As noted above, a connected discontinuous reception (CDRX) operation is implemented to achieve power saving at both UE and network side. When the UE is in the ENDC NSA mode, CDRX parameters are configured on both the LTE RAT and the NR RAT. Based on the CDRX parameters and configurations on both the LTE RAT and the NR RAT, when a start time for an on period of a CDRX cycle on the NR RAT is different than a start time for an on period of a CDRX cycle on the LTE RAT, it will result in power wastage at the UE. This is because since CDRX wake up time of the LTE RAT and the NR RAT is not same, the UE has to perform much more CDRX ON—OFF period toggling (and/or stay awake longer). So, the UE wakes up often for CDRX ON durations and monitors for physical downlink control channel (PDCCH) transmissions.

Aspects of the present disclosure provide techniques for signaling a preferred set of CDRX parameters (e.g., selected to optimize power saving) to a network entity when RAT combinations that have overlapping bands may require share LNA operations. The preferred set of CDRX parameters may be determined such that a CDRX wake up time of a LTE RAT and a NR RAT is same. This may reduce the ON<->OFF toggling and result in power saving at the UE.

In NR Rel-16, a provision is provided for the UE to communicate its preferred set of CDRX parameters (i.e., a DRX-Preference) to the network entity. The network entity on receiving the preferred set of CDRX parameters from the UE will adjust values of CDRX parameters to achieve the UE power saving. However, in the NR Rel-16, an information element (IE) that can be used to send the preferred set of CDRX parameters is illustrated in FIG. 6.

Unfortunately, when the UE requests the preferred set of CDRX parameters via this IE to align CDRX wake up times of the LTE RAT and the NR RAT, only sending the preferred set of CDRX parameters to achieve this wake up time alignment may not be optimal as a start offset may be different for both the LTE RAT and the NR RAT. When the start offset is different for both the LTE RAT and the NR RAT, the on period of the CDRX cycle on the NR RAT will be different than the start time for the on period of the CDRX cycle on the LTE RAT.

Additionally, if DRX cycles are matching on both the LTE RAT and the NR RAT, the UE may attempt to use a delay budget report (as illustrated in FIG. 7) to adjust the start offset, but the delay budget report might not be enough to ensure that the start time for the on period of the CDRX cycle on the NR RAT is same as the start time for the on period of the CDRX cycle on the LTE RAT.

Aspects of the present disclosure provide apparatuses, methods, processing systems, and computer readable mediums for providing a new information element (IE) that may be used to signal a preferred set of CDRX parameters along with a start offset and/or a slot offset associated with the preferred set of CDRX parameters to a network entity. The subject matter described herein provides a greater resolution for CDRX parameters adjustment that the UE is able to request to the network entity to achieve better power saving.

Figure 8:
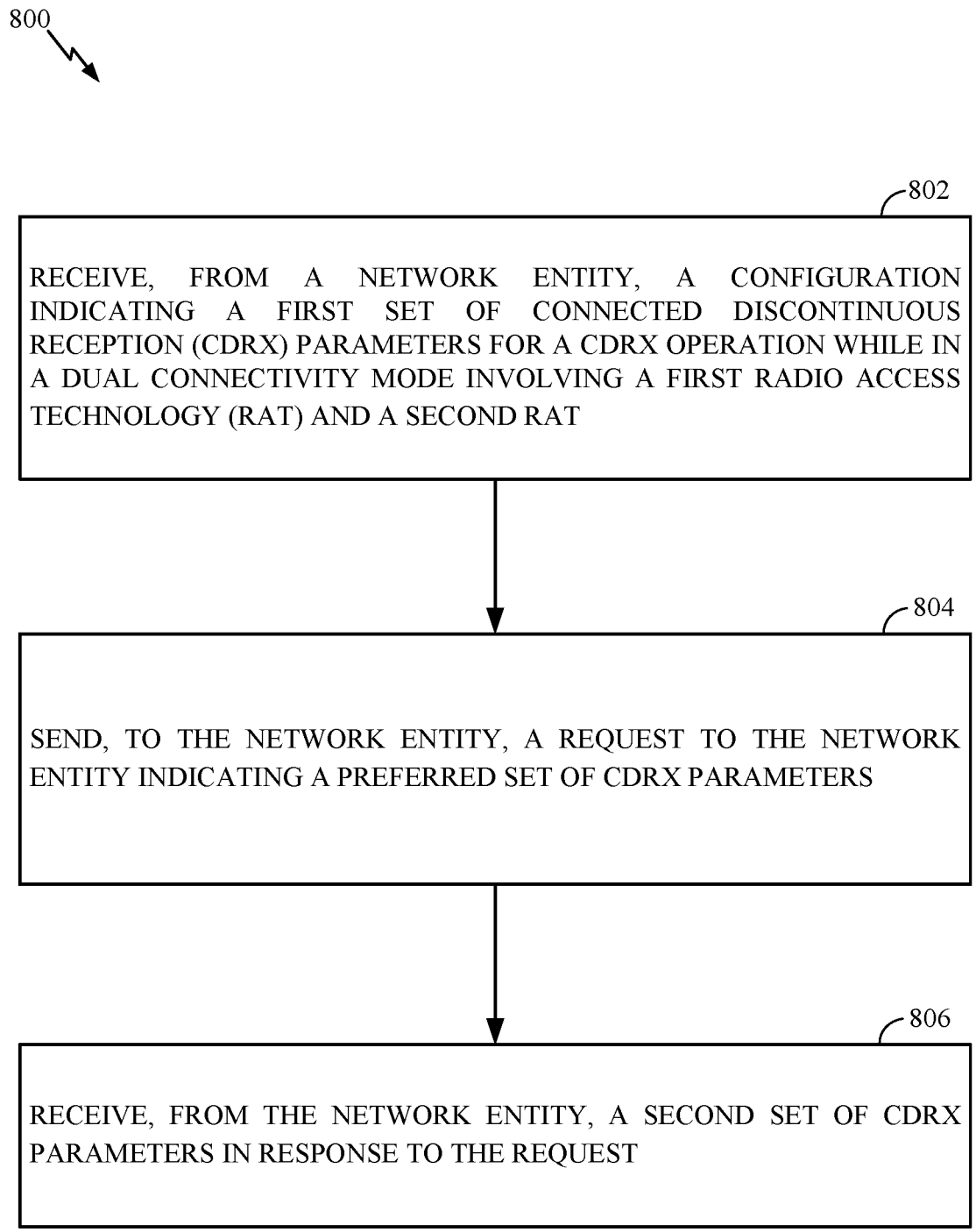
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100) for signaling a preferred set of CDRX parameters to a BS (e.g., such as the BS 110a in the wireless communication network 100). The operations 800 may be implemented as software components that are executed and run on one or more processors (e.g., the controller/processor 280 of FIG. 2). Further, the transmission and reception of signals by the UE in operations 800 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 800 begin, at block 802, by receiving from a network entity a configuration indicating a first set of CDRX parameters for a CDRX operation while in a dual connectivity mode involving a first RAT and a second RAT. For example, the UE may receive the first set of CDRX parameters using antenna(s) and receiver/transceiver components of the UE 120a shown in FIG. 1 or FIG. 2 and/or of the apparatus shown in FIG. 12.

At 804, the UE sends a request to the network entity indicating a preferred set of CDRX parameters. For example, the UE may send the preferred set of CDRX parameters using antenna(s) and transmitter/transceiver components of the UE 120a shown in FIG. 1 or FIG. 2 and/or of the apparatus shown in FIG. 12.

At 806, the UE receives a second set of CDRX parameters in response to the request from the network entity. For example, the UE may receive the second set of CDRX parameters using antenna(s) and receiver/transceiver components of the UE 120a shown in FIG. 1 or FIG. 2 and/or of the apparatus shown in FIG. 12.

Figure 9:
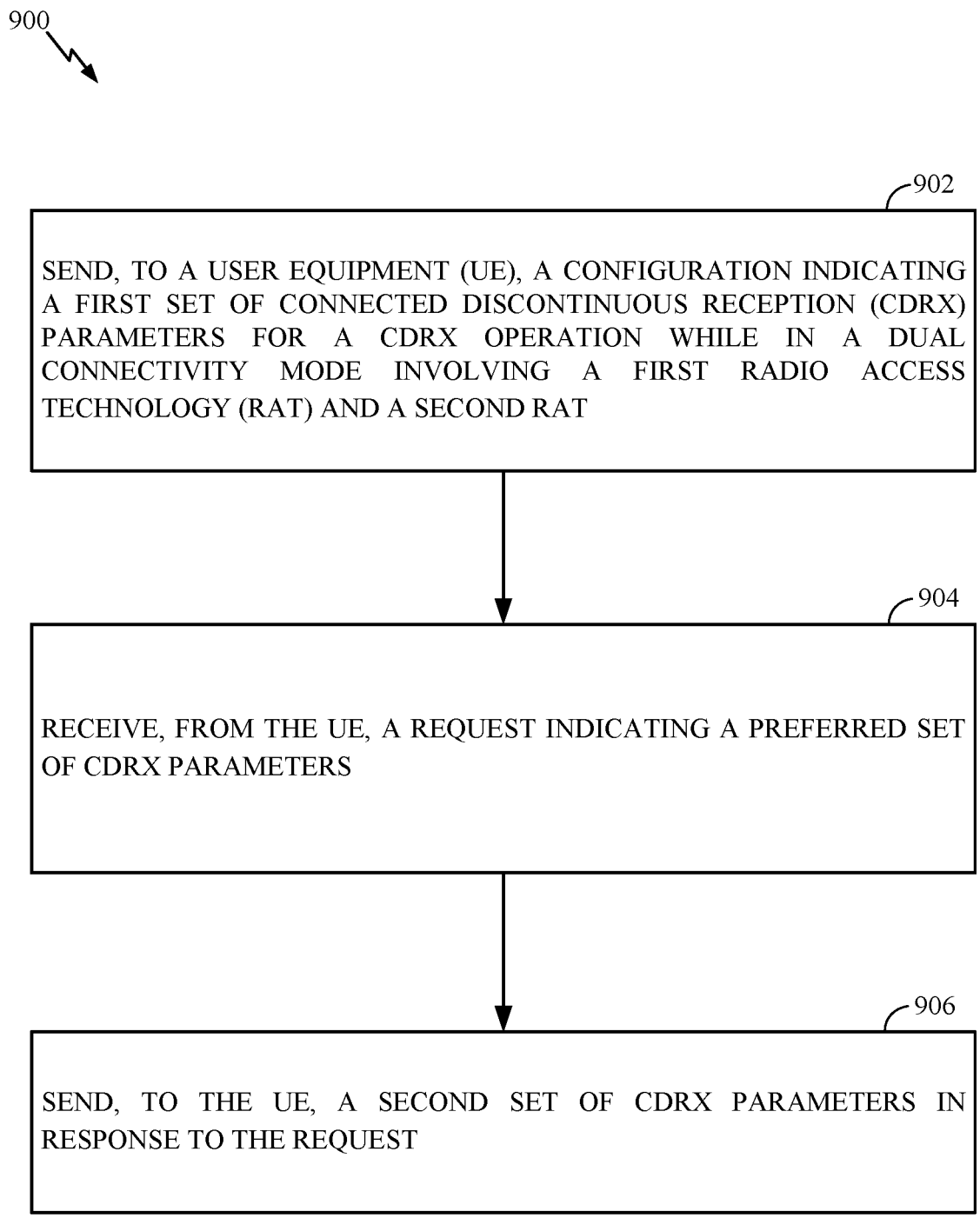
FIG. 9 is a flow diagram illustrating example operations for wireless communication by a BS, in accordance with certain aspects of the present disclosure.

FIG. 9 is a flow diagram illustrating example operations 900 that may be considered complementary to operations 800 of FIG. 8. For example, the operations 900 may be performed by a network entity (e.g., such as the BS 110a in the wireless communication network 100) to receive and process preferred set of CDRX parameters (e.g., sent by the UE performing operations 800 of FIG. 8). The operations 900 may be implemented as software components that are executed and run on one or more processors (e.g., the controller/processor 240 of FIG. 2). Further, the transmission and reception of signals by the BS in operations 900 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 900 begin, at 902, by sending to a UE a configuration indicating a first set of CDRX parameters for a CDRX operation while in a dual connectivity mode involving a first RAT and a second RAT. For example, the network entity may send the first set of CDRX parameters using antenna(s) and transmitter/transceiver components of the BS 110a shown in FIG. 1 or FIG. 2 and/or of the apparatus shown in FIG. 13.

At 904, the network entity receives from the UE a request indicating a preferred set of CDRX parameters. For example, the network entity may receive the preferred set of CDRX parameters using antenna(s) and receiver/transceiver components of the BS 110a shown in FIG. 1 or FIG. 2 and/or of the apparatus shown in FIG. 13.

At 906, the network entity sends a second set of CDRX parameters in response to the request to the UE. For example, the network entity may send the second set of CDRX parameters using antenna(s) and transmitter/transceiver components of the BS 110a shown in FIG. 1 or FIG. 2 and/or of the apparatus shown in FIG. 13.

Figure 10:
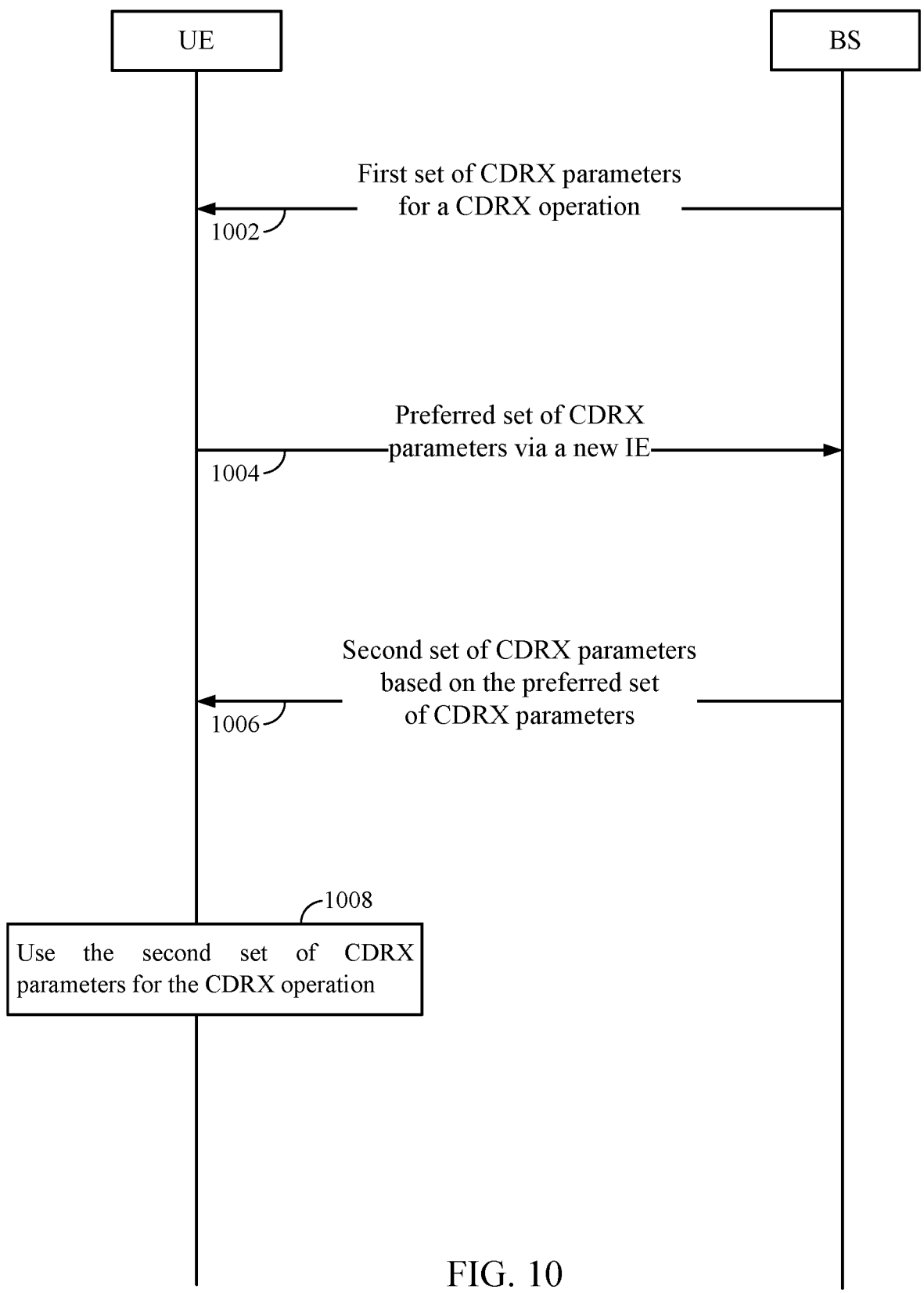
FIG. 10 is a call flow diagram illustrating example signaling for changing CDRX parameters for a CDRX operation while in a dual connectivity mode, in accordance with aspects of the present disclosure.
Figure 11:
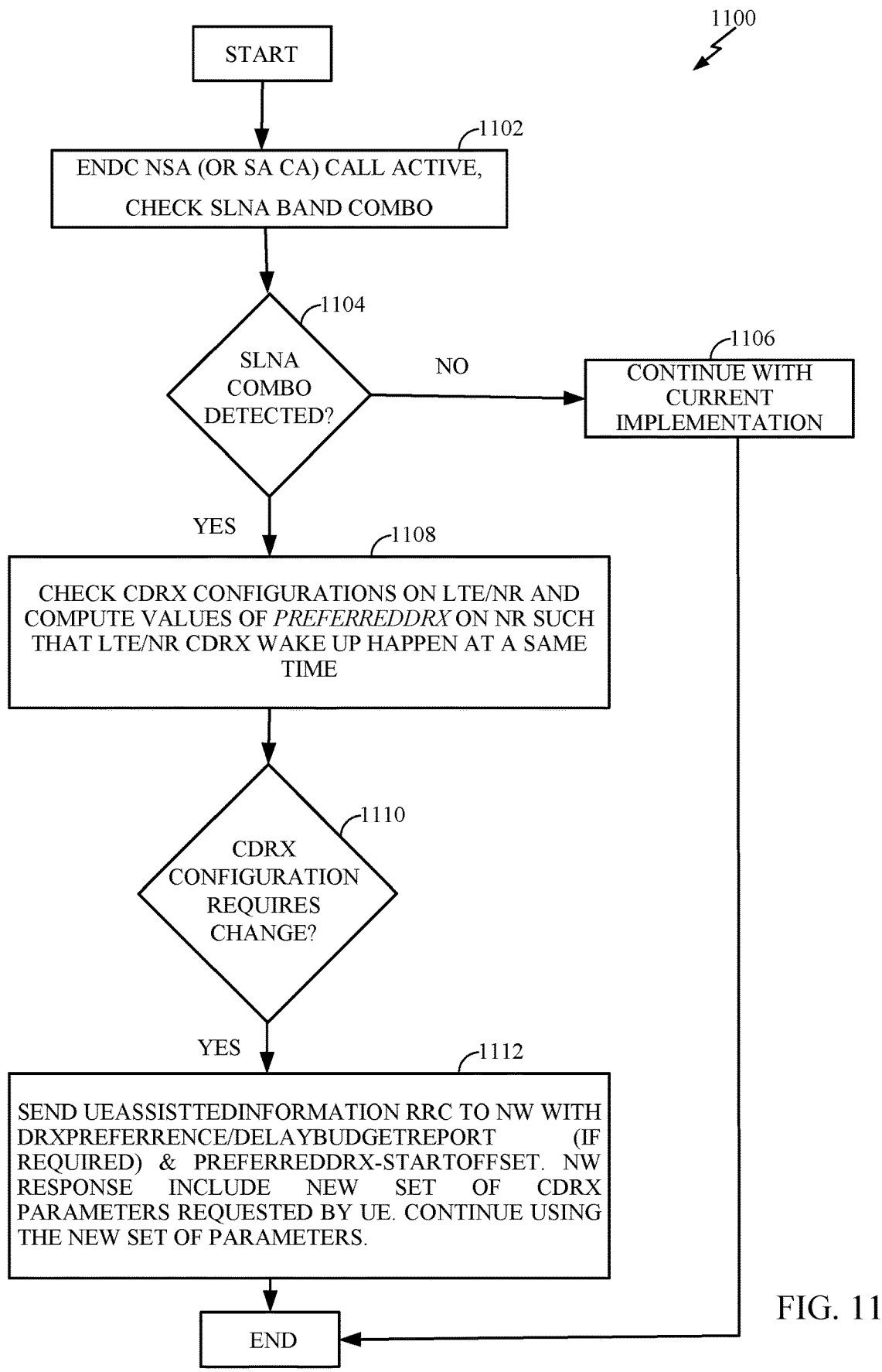
FIG. 11 is a flow diagram illustrating example operations for wireless communication, in accordance with certain aspects of the present disclosure.

The operations shown in FIGS. 8 and 9 may be understood with reference to FIGS. 10 and 11.

As illustrated in FIG. 10, at 1002, a BS (e.g., the BS 102 shown in FIG. 1 or FIG. 2) configures a UE (e.g., the UE 104 shown in FIG. 1 or FIG. 2) with a first set of CDRX parameters for a CDRX operation while the UE is in a dual connectivity mode to a UE. The dual connectivity mode may, for example, may correspond to an ENDC mode, a MRDC mode, a NR—CA mode, or any other mode. The dual connectivity mode involves a first RAT and a second RAT (e.g., an NR RAT and an LTE RAT).

At 1004, the UE sends a preferred set of CDRX parameters to the BS via a new IE. The UE may send the preferred set of CDRX parameters (along with a start offset and a slot offset associated with the preferred set of CDRX parameters) to the BS in one or more scenarios (e.g., when the UE is configured to operate on the first and second RATs with a band combination that results in sharing of RFFE components).

At 1006, the BS sends a second set of CDRX parameters (determined based on the preferred set of CDRX parameters) to the BS.

At 1008, the UE uses the second set of CDRX parameters for the CDRX operation.

Examples of various decision points and logic applied by the UE are illustrated in the flow diagram of FIG. 11. As illustrated in FIG. 11, at 1102, a UE operates in an ENDC NSA or SA connected mode involving a NR RAT and a LTE RAT with a certain band combination. At 1104, the UE determines/checks whether based on the band combination there is sharing of a LNA between the NR RAT and the LTE RAT. When there is no sharing of the LNA between the NR RAT and the LTE RAT, at 1106, the UE continues to use an initial set of CDRX parameters for a CDRX operation.

When the UE detects the sharing of the LNA between the NR RAT and the LTE RAT, at 1108, the UE checks CDRX configurations on the NR RAT and the LTE RAT, based on the initial set of CDRX parameters, to compare a start time for an on period of a CDRX cycle on the NR RAT with a start time for an on period of a CDRX cycle on the LTE RAT.

When the UE determines that the start time for the on period of the CDRX cycle on the NR RAT is different than the start time for the on period of the CDRX cycle on the LTE RAT, the UE then computes a value for a preferred set of CDRX parameters. The value for the preferred set of CDRX parameters is selected in an effort to align the start time for the on period of the CDRX cycle on the NR RAT with the start time for the on period of the CDRX cycle on the LTE RAT. In certain aspects, the value for the preferred set of CDRX parameters is based on a subcarrier spacing to align the start time for the on period of the CDRX cycle on the NR RAT with the start time for the on period of the CDRX cycle on the LTE RAT.

In certain aspects, the UE computes a start offset associated with the preferred set of CDRX parameters. The start offset corresponds to a difference between the start time for the on period of the CDRX cycle on the NR RAT and the start time for the on period of the CDRX cycle on the LTE RAT. The value of the start offset is selected to align the start time for the on period of the CDRX cycle on the NR RAT with the start time for the on period of the CDRX cycle on the LTE RAT. In certain aspects, the value of the start offset is selected based on the value of the preferred set of CDRX parameters.

In certain aspects, the UE computes a slot offset associated with the preferred set of CDRX parameters. The slot offset corresponds to a delay before starting an on duration timer of at least one of a CDRX cycle on the NR RAT or a CDRX cycle on the LTE RAT. The value of the slot offset is selected to align the start time for the on period of the CDRX cycle on the NR RAT with the start time for the on period of the CDRX cycle on the LTE RAT. In certain aspects, the value of the slot offset is selected based on the value of the preferred set of CDRX parameters.

At 1110, the UE determines whether a CDRX configuration (e.g., the initial set of CDRX parameters) has to be changed (so that the start time for the on period of the CDRX cycle on the NR RAT can be aligned with the start time for the on period of the CDRX cycle on the LTE RAT). When the UE determines that the CDRX configuration has to be changed, then at 1112, the UE sends UAI to the BS via a new IE. The UAI includes a request indicating the preferred set of CDRX parameters, the start offset associated with the preferred set of CDRX parameters, and/or the slot offset associated with the preferred set of CDRX parameters. In certain aspects, the UAI further includes a delay budget report.

In one example, the new IE is indicated as:
preferredDRX-StartOffset SEQUENCE (INTEGER (0 . . . 10239), INTEGER (0 . . . 32))

In another example, the new IE is indicated as:

```
preferredDRX-StartOffset ::= SEQUENCE {
StartOffset INTEGER (0..10239),
SlotOffset INTEGER (0..32)
}
```

The BS then sends a new set of CDRX parameters to the UE based on the preferred set of CDRX parameters, the start offset associated with the preferred set of CDRX parameters, the slot offset associated with the preferred set of CDRX parameters, and/or the delay budget report. The UE uses the new set of CDRX parameters for the CDRX operation.

Example Wireless Communication Devices

Figure 12:
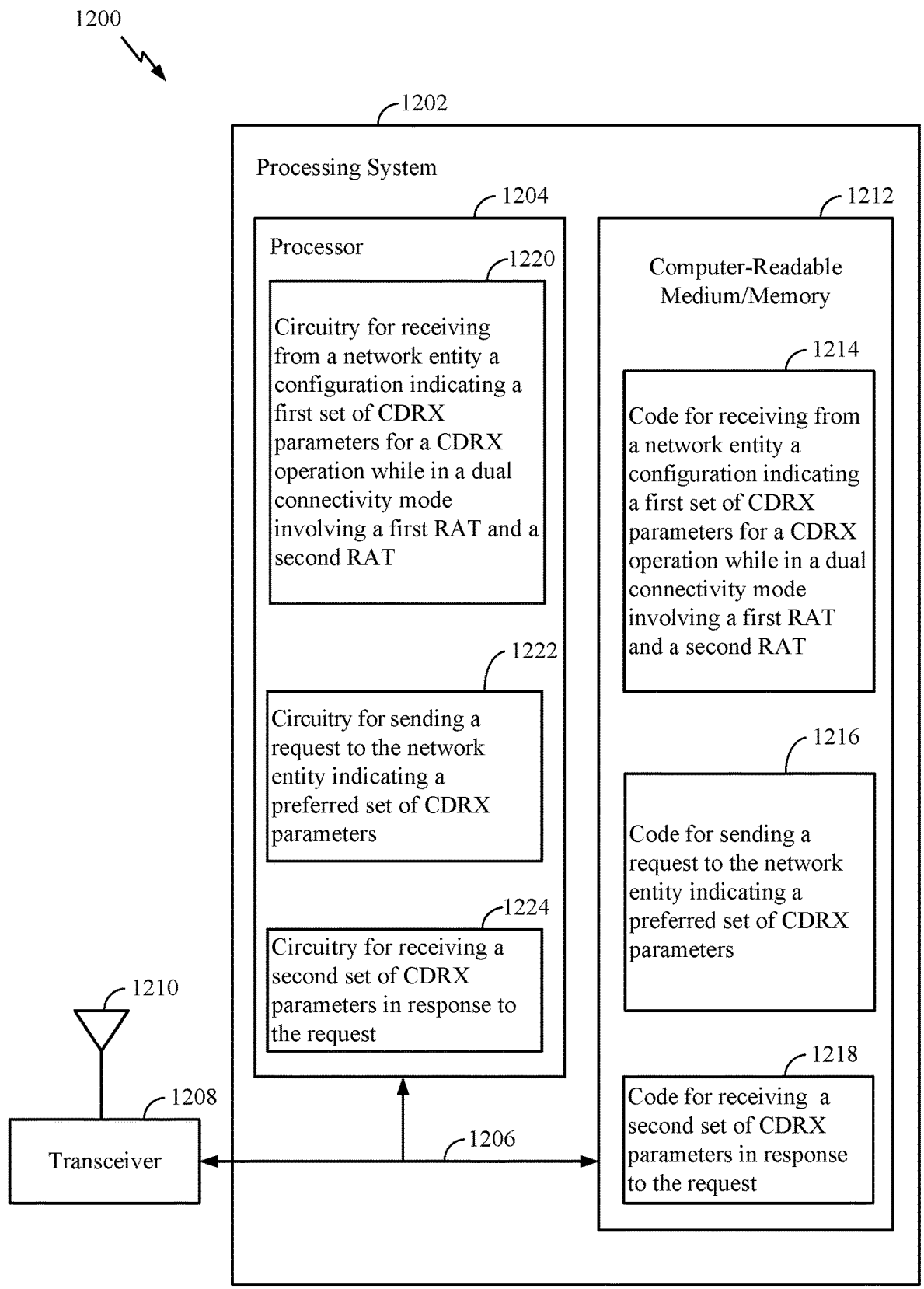
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for receiving, code 1216 for sending, and code 1218 for receiving. The code 1214 for receiving may include code for receiving from a network entity a configuration indicating a first set of CDRX parameters for a CDRX operation while in a dual connectivity mode involving a first RAT and a second RAT. The code 1216 for sending may include code for sending a request to the network entity indicating a preferred set of CDRX parameters. The code 1218 for receiving may include code for receiving from the network entity a second set of CDRX parameters in response to the request.

The processor 1204 may include circuitry configured to implement the code stored in the computer-readable medium/memory 1212, such as for performing the operations illustrated in FIG. 9, as well as other operations for performing the various techniques discussed herein. For example, the processor 1204 includes circuitry 1220 for receiving, circuitry 1222 for sending, and circuitry 1224 for receiving. The circuitry 1220 for receiving may include circuitry for receiving from a network entity a configuration indicating a first set of CDRX parameters for a CDRX operation while in a dual connectivity mode involving a first RAT and a second RAT. The circuitry 1222 for sending may include circuitry for sending a request to the network entity indicating a preferred set of CDRX parameters. The circuitry 1224 for receiving may include circuitry for receiving from the network entity a second set of CDRX parameters in response to the request.

Figure 13:
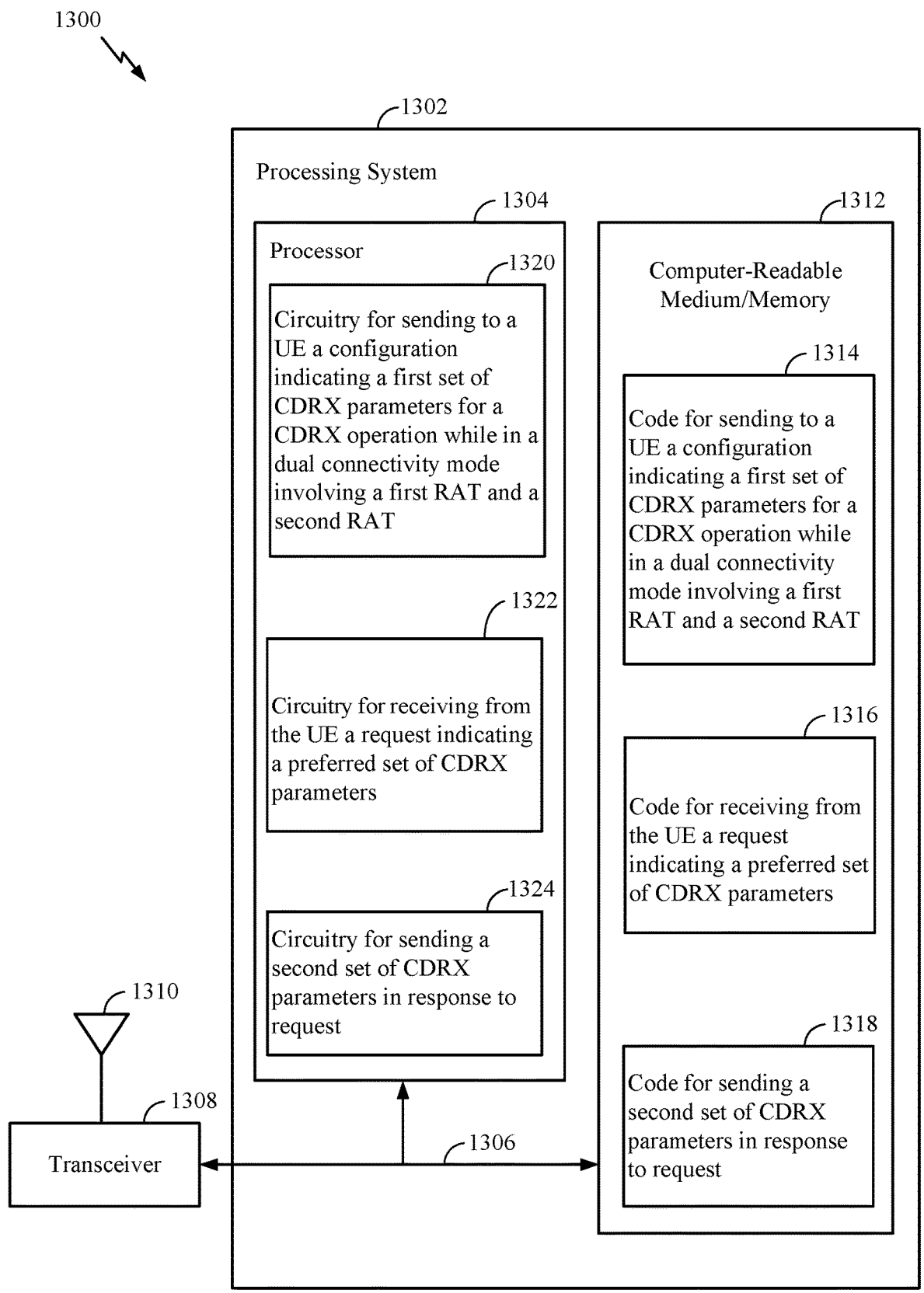
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 10, or other operations for performing the various techniques discussed herein. In certain aspects, computer-readable medium/memory 1312 stores code 1314 for sending, code 1316 for receiving, and code 1318 for sending. The code 1314 for sending may include code for sending to a UE a configuration indicating a first set of CDRX parameters for a CDRX operation while in a dual connectivity mode involving a first RAT and a second RAT. The code 1316 for receiving may include code for receiving from the UE a request indicating a preferred set of CDRX parameters. The code 1318 for sending may include code for sending to the UE a second set of CDRX parameters in response to the request.

The processor 1304 may include circuitry configured to implement the code stored in the computer-readable medium/memory 1312, such as for performing the operations illustrated in FIG. 10, as well as other operations for performing the various techniques discussed herein. For example, the processor 1304 includes circuitry 1320 for sending, circuitry 1322 for receiving, and circuitry 1324 for sending. The circuitry 1320 for sending may include circuitry for sending to a UE a configuration indicating a first set of CDRX parameters for a CDRX operation while in a dual connectivity mode involving a first RAT and a second RAT. The circuitry 1322 for receiving may include circuitry for receiving from the UE a request indicating a preferred set of CDRX parameters. The circuitry 1324 for sending may include circuitry for sending to the UE a second set of CDRX parameters in response to the request.

Example Aspects

Implementation examples are described in the following numbered aspects.

In a first aspect, a method for wireless communications by a user equipment (UE), comprising: receiving, from a network entity, a configuration indicating a first set of connected discontinuous reception (CDRX) parameters for a CDRX operation while in a dual connectivity mode involving a first radio access technology (RAT) and a second RAT; sending a request to the network entity indicating a preferred set of CDRX parameters; and receiving, from the network entity, a second set of CDRX parameters in response to the request.

In a second aspect, alone or in combination with the first aspect, the preferred set of CDRX parameters are indicated to the network entity via an information element (IE).

In a third aspect, alone or in combination with one or more of the first and second aspects, the IE indicates at least one start offset associated with the preferred set of CDRX parameters, and wherein the start offset corresponds to a difference between a start time for an on period of a CDRX cycle on the first RAT and a start time for an on period of a CDRX cycle on the second RAT.

In a fourth aspect, alone or in combination with one or more of the first through third aspects, the IE indicates at least one slot offset associated with the preferred set of CDRX parameters, and wherein the slot offset corresponds to a delay before starting an on duration timer of at least one of a CDRX cycle on the first RAT or a CDRX cycle on the second RAT.

In a fifth aspect, alone or in combination with one or more of the first through fourth aspects, the request is sent if the UE is configured to operate on the first and second RATs with a band combination that results in sharing of radio frequency (RF) front end (RFFE) components and detects sharing of the RFFE components.

In a sixth aspect, alone or in combination with one or more of the first through fifth aspects, the dual connectivity mode corresponds to at least one: an evolved universal terrestrial radio access (E-UTRA) new radio (NR)—dual connectivity (ENDC) mode, a multiple radio dual connectivity (MRDC) mode, or a NR—carrier aggregation (CA) mode.

In a seventh aspect, alone or in combination with one or more of the first through sixth aspects, the first RAT comprises a new radio (NR) RAT; and the second RAT comprises a long term evolution (LTE) RAT.

In an eighth aspect, alone or in combination with one or more of the first through seventh aspects, checking CDRX configurations on the first and second RATs to compare a start time for an on period of a CDRX cycle on the first RAT with a start time for an on period of a CDRX cycle on the second RAT.

In a ninth aspect, alone or in combination with one or more of the first through eighth aspects, computing a value for the preferred set of CDRX parameters when the start time for the on period of the CDRX cycle on the first RAT is different than the start time for the on period of the CDRX cycle on the second RAT.

In a tenth aspect, alone or in combination with one or more of the first through ninth aspects, the value for the preferred set of CDRX parameters is selected in an effort to align the start time for the on period of the CDRX cycle on the first RAT with the start time for the on period of the CDRX cycle on the second RAT.

In an eleventh aspect, alone or in combination with one or more of the first through tenth aspects, the value for the preferred set of CDRX parameters is based on a subcarrier spacing.

In a twelfth aspect, alone or in combination with one or more of the first through eleventh aspects, using the second set of CDRX parameters for a connection with the network entity.

In a thirteenth aspect, alone or in combination with one or more of the first through twelfth aspects, the request is sent via a UE assistance information (UAI).

In a fourteenth aspect, alone or in combination with one or more of the first through thirteenth aspects, the UAI further indicates a delay budget report.

In a fifteenth aspect, a method for wireless communications by a network entity, comprising: sending, to a user equipment (UE), a configuration indicating a first set of connected discontinuous reception (CDRX) parameters for a CDRX operation while in a dual connectivity mode involving a first radio access technology (RAT) and a second RAT; receiving, from the UE, a request indicating a preferred set of CDRX parameters; and sending, to the UE, a second set of CDRX parameters in response to the request.

In a sixteenth aspect, alone or in combination with the fifteenth aspect, the preferred set of CDRX parameters are indicated to the network entity via an information element (IE).

In a seventeenth aspect, alone or in combination with one or more of the fifteenth and sixteenth aspects, the IE indicates at least one start offset associated with the preferred set of CDRX parameters, and wherein the start offset corresponds to a difference between a start time for an on period of a CDRX cycle on the first RAT and a start time for an on period of a CDRX cycle on the second RAT.

In an eighteenth aspect, alone or in combination with one or more of the fifteenth through seventeenth aspects, the IE indicates at least one slot offset associated with the preferred set of CDRX parameters, and wherein the slot offset corresponds to a delay before starting an on duration timer of at least one of a CDRX cycle on the first RAT or a CDRX cycle on the second RAT.

In a nineteenth aspect, alone or in combination with one or more of the fifteenth through eighteenth aspects, the request is received if the UE is configured to operate on the first and second RATs with a band combination that results in sharing of radio frequency (RF) front end (RFFE) components and detects sharing of the RFFE components.

In a twentieth aspect, alone or in combination with one or more of the fifteenth through nineteenth aspects, the dual connectivity mode corresponds to at least one of: an evolved universal terrestrial radio access (E-UTRA) new radio (NR)—dual connectivity (ENDC) mode, a multiple radio dual connectivity (MRDC) mode, or a NR—carrier aggregation (CA) mode.

In a twenty-first aspect, alone or in combination with one or more of the fifteenth through twentieth aspects, the first RAT comprises a new radio (NR) RAT; and the second RAT comprises a long term evolution (LTE) RAT.

In a twenty-second aspect, alone or in combination with one or more of the fifteenth through twenty-first aspects, the request is received via a UE assistance information (UAI).

In a twenty-third aspect, alone or in combination with one or more of the fifteenth through twenty-two aspects, the UAI further indicates a delay budget report.

An apparatus for wireless communication, comprising at least one processor; and a memory coupled to the at least one processor, the memory comprising code executable by the at least one processor to cause the apparatus to perform the method of any of the first through twenty-third aspects.

An apparatus comprising means for performing the method of any of the first through twenty-third aspects.

A computer readable medium storing computer executable code thereon for wireless communications that, when executed by at least one processor, cause an apparatus to perform the method of any of the first through twenty-third aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving, from a network entity, a configuration indicating a first set of connected discontinuous reception (CDRX) parameters for a CDRX operation while in a dual connectivity mode involving a first radio access technology (RAT) and a second RAT;
sending a request to the network entity indicating a preferred set of CDRX parameters to align an ON period of a CDRX cycle on the first RAT with an ON period of a CDRX cycle on the second RAT, wherein the request further indicates a start offset corresponding to a difference between a start time for the ON period of the CDRX cycle on the first RAT and a start time for the ON period of the CDRX cycle on the second RAT; and
receiving, from the network entity, a second set of CDRX parameters in response to the request.

2. The method of claim 1, wherein the preferred set of CDRX parameters are indicated to the network entity via an information element (IE).

3. The method of claim 2, wherein the IE indicates the start offset associated with the preferred set of CDRX parameters.

4. The method of claim 2, wherein the IE indicates at least one slot offset associated with the preferred set of CDRX parameters, and wherein the slot offset corresponds to a delay before starting an on duration timer of at least one of the CDRX cycle on the first RAT or the CDRX cycle on the second RAT.

5. The method of claim 1, wherein the request is sent if the UE is configured to operate on the first and second RATs with a band combination that results in sharing of radio frequency (RF) front end (RFFE) components and detects sharing of the RFFE components.

6. The method of claim 1, wherein the dual connectivity mode corresponds to at least one of: an evolved universal terrestrial radio access (E-UTRA) new radio (NR)—dual connectivity (ENDC) mode, a multiple radio dual connectivity (MRDC) mode, or a NR—carrier aggregation (CA) mode.

7. The method of claim 1, wherein:
the first RAT comprises a new radio (NR) RAT; and
the second RAT comprises a long term evolution (LTE) RAT.

8. The method of claim 1, further comprising:
checking CDRX configurations on the first and second RATs to compare the start time for the ON period of the CDRX cycle on the first RAT with the start time for the ON period of the CDRX cycle on the second RAT.

9. The method of claim 8, further comprising:
computing a value for the preferred set of CDRX parameters when the start time for the ON period of the CDRX cycle on the first RAT is different than the start time for the ON period of the CDRX cycle on the second RAT.

10. The method of claim 9, wherein the value for the preferred set of CDRX parameters is selected in an effort to align the start time for the ON period of the CDRX cycle on the first RAT with the start time for the ON period of the CDRX cycle on the second RAT.

11. The method of claim 10, wherein the value for the preferred set of CDRX parameters is based on a subcarrier spacing.

12. The method of claim 1, further comprising:
using the second set of CDRX parameters for a connection with the network entity.

13. The method of claim 1, wherein the request is sent via a UE assistance information (UAI).

14. The method of claim 13, wherein the UAI further indicates a delay budget report.

15. A method for wireless communications by a network entity, comprising:
sending, to a user equipment (UE), a configuration indicating a first set of connected discontinuous reception (CDRX) parameters for a CDRX operation while in a dual connectivity mode involving a first radio access technology (RAT) and a second RAT;
receiving, from the UE, a request indicating a preferred set of CDRX parameters to align an ON period of a CDRX cycle on the first RAT with an ON period of a CDRX cycle on the second RAT, wherein the request further indicates a start offset corresponding to a difference between a start time for the ON period of the CDRX cycle on the first RAT and a start time for the ON period of the CDRX cycle on the second RAT; and
sending, to the UE, a second set of CDRX parameters in response to the request.

16. The method of claim 15, wherein the preferred set of CDRX parameters are indicated to the network entity via an information element (IE).

17. The method of claim 16, wherein the IE indicates the start offset associated with the preferred set of CDRX parameters.

18. The method of claim 16, wherein the IE indicates at least one slot offset associated with the preferred set of CDRX parameters, and wherein the slot offset corresponds to a delay before starting an on duration timer of at least one of the CDRX cycle on the first RAT or the CDRX cycle on the second RAT.

19. The method of claim 15, wherein the request is received if the UE is configured to operate on the first and second RATs with a band combination that results in sharing of radio frequency (RF) front end (RFFE) components and detects sharing of the RFFE components.

20. The method of claim 15, wherein the dual connectivity mode corresponds to at least one of: an evolved universal terrestrial radio access (E-UTRA) new radio (NR)—dual connectivity (ENDC) mode, a multiple radio dual connectivity (MRDC) mode, or a NR—carrier aggregation (CA) mode.

21. The method of claim 15, wherein:
the first RAT comprises a new radio (NR) RAT; and
the second RAT comprises a long term evolution (LTE) RAT.

22. The method of claim 15, wherein the request is received via a UE assistance information (UAI).

23. The method of claim 22, wherein the UAI further indicates a delay budget report.

24. An apparatus for wireless communications by a user equipment (UE), comprising:
at least one processor and a memory configured to:
receive, from a network entity, a configuration indicating a first set of connected discontinuous reception (CDRX) parameters for a CDRX operation while in a dual connectivity mode involving a first radio access technology (RAT) and a second RAT;

send a request to the network entity indicating a preferred set of CDRX parameters to align an ON period of a CDRX cycle on the first RAT with an ON period of a CDRX cycle on the second RAT, wherein the request further indicates a start offset corresponding to a difference between a start time for the ON period of the CDRX cycle on the first RAT and a start time for the ON period of the CDRX cycle on the second RAT; and receive, from the network entity, a second set of CDRX parameters in response to the request.

25. The apparatus of claim 24, wherein the preferred set of CDRX parameters are indicated to the network entity via an information element (IE).

26. The apparatus of claim 25, wherein the IE indicates at least one the start offset associated with the preferred set of CDRX parameters.

27. The apparatus of claim 25, wherein the IE indicates at least one slot offset associated with the preferred set of CDRX parameters, and wherein the slot offset corresponds to a delay before starting an on duration timer of at least one of the CDRX cycle on the first RAT or the CDRX cycle on the second RAT.

28. An apparatus for wireless communications by a network entity, comprising:
at least one processor and a memory configured to:
send, to a user equipment (UE), a configuration indicating a first set of connected discontinuous reception (CDRX) parameters for a CDRX operation while in a dual connectivity mode involving a first radio access technology (RAT) and a second RAT;

receive, from the UE, a request indicating a preferred set of CDRX parameters to align an ON period of a CDRX cycle on the first RAT with an ON period of a CDRX cycle on the second RAT, wherein the request further indicates a start offset corresponding to a difference between a start time for the ON period of the CDRX cycle on the first RAT and a start time for the ON period of the CDRX cycle on the second RAT; and send, to the UE, a second set of CDRX parameters in response to the request.

29. The apparatus of claim 28, wherein the preferred set of CDRX parameters are indicated to the network entity via an information element (IE).

30. The apparatus of claim 29, wherein the IE indicates the start offset associated with the preferred set of CDRX parameters, and wherein the IE further indicates at least one slot offset associated with the preferred set of CDRX parameters, and wherein the slot offset corresponds to a delay before starting an on duration timer of at least one of the CDRX cycle on the first RAT or the CDRX cycle on the second RAT.

* * * * *